United States Patent
Nam et al.

(10) Patent No.: US 9,645,293 B2
(45) Date of Patent: *May 9, 2017

(54) METHOD OF MANUFACTURING THIN FILM POLARIZER, AND THIN FILM POLARIZER AND POLARIZING PLATE MANUFACTURED USING THE SAME

(71) Applicant: LG Chem, Ltd., Seoul (KR)

(72) Inventors: Sung Hyun Nam, Daejeon (KR); Jong-Hyun Jung, Daejeon (KR); Kyun-Il Rah, Daejeon (KR); Hye-Min Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 216 days.

This patent is subject to a terminal disclaimer.

(21) Appl. No.: 14/385,935

(22) PCT Filed: Jun. 13, 2014

(86) PCT No.: PCT/KR2014/005231
§ 371 (c)(1),
(2) Date: Sep. 17, 2014

(87) PCT Pub. No.: WO2014/204143
PCT Pub. Date: Dec. 24, 2014

(65) Prior Publication Data
US 2016/0103259 A1 Apr. 14, 2016

(30) Foreign Application Priority Data

Jun. 18, 2013 (KR) .......................... 10-2013-0069633
Jun. 3, 2014 (KR) .......................... 10-2014-0067603

(51) Int. Cl.
*G02B 5/30* (2006.01)
*G02B 1/08* (2006.01)
(Continued)

(52) U.S. Cl.
CPC ............ *G02B 5/3033* (2013.01); *B32B 37/12* (2013.01); *G02B 1/08* (2013.01); *B32B 37/1284* (2013.01);
(Continued)

(58) Field of Classification Search
CPC ..... B29C 55/00; B29C 55/005; B29C 55/023; B29C 55/026; B29C 55/04; B29C 55/06;
(Continued)

(56) References Cited

U.S. PATENT DOCUMENTS

2009/0009696 A1   1/2009 Kye et al.
2010/0202051 A1   8/2010 Yoshimi et al.
(Continued)

FOREIGN PATENT DOCUMENTS

CN     102326105 A     1/2012
JP     2000-338329     8/2000
(Continued)

*Primary Examiner* — Scott J Sugarman
*Assistant Examiner* — Robert E Tallman
(74) *Attorney, Agent, or Firm* — Dentons US LLP (57) ABSTRACT

A method of manufacturing a thin film polarizer includes forming a film laminate by allowing a non-oriented polyvinyl alcohol-based film to be bonded to and sandwiched between two or more non-oriented polymer films using attractive force or an adhesive layer, orienting the film laminate so that the polyvinyl alcohol-based film has a thickness of 10 μm or less, and separating the polymer films and the polyvinyl alcohol-based film of the oriented film laminate from each other.

6 Claims, 3 Drawing Sheets

(51) Int. Cl.
*B32B 37/12* (2006.01)
*B32B 38/10* (2006.01)
*B32B 37/20* (2006.01)
*B32B 38/00* (2006.01)

(52) U.S. Cl.
CPC ............. *B32B 37/203* (2013.01); *B32B 38/10* (2013.01); *B32B 2038/0068* (2013.01); *B32B 2307/42* (2013.01); *B32B 2307/54* (2013.01); *B32B 2309/105* (2013.01); *B32B 2457/20* (2013.01)

(58) Field of Classification Search
CPC ....... B29C 55/065; B29C 55/08; B29C 55/18; B32B 37/00; B32B 37/14; B32B 37/24; B32B 37/26; B32B 37/268; B32B 37/30
USPC ..... 156/1, 60, 166, 167, 168, 169, 229, 242; 359/487.01–487.06, 900
See application file for complete search history.

(56) References Cited

U.S. PATENT DOCUMENTS

2010/0288420 A1* 11/2010 Kimura ............... B32B 38/1841
  156/64
2012/0327512 A1* 12/2012 Goto .................... G02B 5/3033
  359/487.02
2014/0178608 A1* 6/2014 Yoon ...................... C09J 133/08
  428/1.55

FOREIGN PATENT DOCUMENTS

| | | |
|---|---|---|
| JP | 2000338329 A | 12/2000 |
| KR | 10-2009-0002630 | 1/2009 |
| KR | 10-2011-0118825 | 11/2011 |
| KR | 10-2013-0009394 A | 1/2013 |
| KR | 10-2014-0063442 | 5/2014 |
| KR | 10-2014-0063451 | 5/2014 |
| WO | WO 2013/028047 * | 2/2013 |

* cited by examiner

METHOD OF MANUFACTURING THIN FILM POLARIZER, AND THIN FILM POLARIZER AND POLARIZING PLATE MANUFACTURED USING THE SAME

This application is a National Stage Entry of International Application No. PCT/KR2014/005231, filed Jun. 13, 2014, and claims the benefit of Korean Application No. 10-2013-0069633 filed on Jun. 18, 2013, and Korean Application No. 10-2014-0067603, filed Jun. 3, 2014, all of which are hereby incorporated by reference in their entirety for all purposes as if fully set forth herein.

TECHNICAL FIELD

The present disclosure relates to a method of manufacturing a thin film polarizer and a thin film polarizer and a polarizing plate manufactured using the same, and more particularly, to a method of manufacturing a thin film polarizer having a reduced thickness of 10 μm or less, and a thin film polarizer and a polarizing plate manufactured using the same.

BACKGROUND ART

Polarizers used in polarizing plates are optical devices enabling natural light or optionally selected polarized light to be converted into polarized light having specific directionality and have been widely used in display devices such as liquid crystal display devices and organic light emitting devices (OLED). As polarizers used in display devices to date, polyvinyl alcohol (PVA)-based polarizing films including an iodine-based compound or a dichroic dye and having a molecular chain aligned in a predetermined direction have generally been used.

Polyvinyl alcohol-based polarizing films have commonly been manufactured through a method of dying polyvinyl alcohol-based films with iodine or a dichroic dye to then be oriented and crosslinked in a predetermined direction. In this case, such an orientation process may be performed through a wet orientation process performed using a solution such as a boric acid aqueous solution or an iodine aqueous solution or through a dry orientation process performed in an atmospheric environment, where an orientation magnification is generally five or more times. However, in order to perform an orientation process in the manufacturing process according to the related art without the occurrence of breakages, polyvinyl alcohol-based films are required to have a thickness greater than 60 μm before the orientation process is performed. When polyvinyl alcohol-based films have a thickness of 60 μm or less before the orientation process, a degree of swelling of polyvinyl alcohol-based films may be increased, and a modulus of elasticity per unit area may be increased due to a relatively reduced thickness such that breakages may easily occur in an orientation process.

On the other hand, in accordance with the recent trend for slimness in display devices, polarizing plates are also required to have relatively reduced thicknesses. However, when polyvinyl alcohol-based films having a thickness exceeding 60 μm before an orientation process, as in the case of the related art, are used, there may be limitations in reducing polarizer thicknesses. Therefore, research into the manufacturing of polarizers having a relatively reduced thickness has been undertaken.

Korean Patent Laid-Open Publication No. 2010-0071998 discloses a method of manufacturing a thin film polarizing plate using a stacked body manufactured by coating a base layer with a hydrophilic polymer layer or co-extruding a base layer formation material and a hydrophilic polymer layer formation material. However, in the case of the coating method or the coextrusion method, since a polyvinyl alcohol layer may not be easily separated from the base layer after the orientation process is performed and relatively great peel strength is required for the separation thereof, a problem in which the polyvinyl alcohol layer is damaged or transformed during the separation process, or the like, may occur. As a result, physical optical properties such as a degree of polarization of polyvinyl alcohol films and the like may be degraded. In addition, when the coating method or the coextrusion method is used, since polyvinyl alcohol films are manufactured in a scheme of dissolving a polyvinyl alcohol resin and then extruding the same or producing a coating solution and applying the same, physical properties of polyvinyl alcohol films manufactured according to extrusion conditions, coating conditions, or unveiling conditions may be easily changed. Thus, difficulties in implementing uniform physical properties are present while physical properties of consequently manufactured polyvinyl alcohol films are deteriorated.

DISCLOSURE

Technical Problem

Some embodiments of the present disclosure may provide a method of manufacturing a polarizer having a relatively reduced thickness while having excellent process stability and optical properties.

Technical Solution

According to some embodiments of the present disclosure, a method of manufacturing a thin film polarizer may include forming a film laminate by allowing a non-oriented polyvinyl alcohol-based film to be bonded to and sandwiched between two or more non-oriented polymer films using attractive force or an adhesive layer, orienting the film laminate so that the polyvinyl alcohol-based film has a thickness of 10 μm or less, and separating the polymer films and the polyvinyl alcohol-based film of the oriented film laminate from each other.

The film laminate may include a first non-oriented polymer film, a first non-oriented polyvinyl alcohol-based film bonded to the first non-oriented polymer film, and a second non-oriented polymer film bonded to the first non-oriented polyvinyl alcohol-based film.

The film laminate may include a first non-oriented polymer film, a first non-oriented polyvinyl alcohol-based film bonded to the first non-oriented polymer film, a second non-oriented polymer film bonded to the first non-oriented polyvinyl alcohol-based film, a second non-oriented polyvinyl alcohol-based film bonded to the second non-oriented polymer film, and a third non-oriented polymer film bonded to the second non-oriented polyvinyl alcohol-based film.

The non-oriented polymer film may be provided as a polymer film having a maximum orientation magnification of five or more times at a temperature ranging from 20° C. to 85° C., in detail, having a maximum orientation magnification ranging from around 5 to 15 times. For example, as examples of non-oriented polymer films, a high-density polyethylene film, a polyurethane film, a polypropylene film, a polyolefin film, an ester-based film, a low-density polyethylene film, high-density polyethylene and low-density polyethylene coextrusion films, a copolymer resin film containing ethylene vinyl acetate in high-density polyethylene, an acrylic film, a polyethylene terephthalate film, a polyvinyl alcohol-based film, a cellulose-based film, and the like, may be provided.

The orienting of the film laminate may be performed through dry orientation or wet orientation, and in the case of wet orientation, the orienting of the film laminate may be performed in a boron aqueous solution having a boron concentration ranging from 1 to 5 wt %.

The orienting of the film laminate may be performed at a temperature of 20° C. to 85° C. at an orientation magnification of 5 to 15 times.

The method may further include dyeing the non-oriented polyvinyl alcohol-based film with at least one of iodine and a dichroic dye before the orienting of the film laminate.

The separating of the polymer film from the polyvinyl alcohol-based film in the oriented film laminate is performed by applying 2N/2 cm or less of peel strength.

According to some embodiments of the present disclosure, a thin film polarizer may be manufactured through the method described above, and the thin film polarizer may have a thickness of 10 μm or less and have group transmittance of 40 to 45% and a degree of polarization of 99% or more.

According to some embodiments of the present disclosure, a polarizing plate including the thin film polarizer described above may be provided.

Advantageous Effects

In the method of manufacturing a thin film polarizer according to an exemplary embodiment of the present disclosure, a thin film polarizer having a thickness of 10 μm or less while having excellent process stability may be manufactured through a simplified process.

In addition, according to an exemplary embodiment of the present disclosure, in a case in which an orientation process is performed using a film laminate in which a PVA film is disposed between two or more non-oriented polymer films, a breakage occurrence rate may be significantly reduced even in the case of performing a high magnification orientation so as to increase the degree of orientation of a PVA polarizer. As a result, a thin film polarizer having excellent physical optical properties may be manufactured.

BEST MODE FOR INVENTION

As a result of repeated research conducted in order to manufacture a thin film polyvinyl alcohol-based polarizing film, the inventors of the present disclosure found that by using a stacked film formed by bonding a non-oriented polyvinyl alcohol-based film having a reduced thickness to one surface or both surfaces of a non-oriented polymer film, a polarizer having superior optical properties such as a high degree of polarization or the like while having a reduced thickness of 10 μm or less may be manufactured without the occurrence of breakages during a manufacturing process, and have filed the applications with Korean Patent Application No. 10-2012-0130576 (Title of Invention: Method of Manufacturing Thin Film Polarizer, and Thin Film Polarizer and Polarizing Plate Using the Same) and 10-2012-0130577 (Title of Invention: Method of Manufacturing Thin Film Polarizer, and Thin Film Polarizer and Polarizing Plate Using the Same).

However, in the case of these filed applications, there were limitations in terms of the extent to which a breakage occurrence rate could be reduced. For example, since adhesion between a polymer film and a polyvinyl alcohol-based film is relatively low, problems in which the polyvinyl alcohol-based film and the poly film are separated from each other and the like occurred during a process, thereby deteriorating stability in the process. Therefore, the present disclosure is provided as the result of repeated research undertaken by the inventors of the present disclosure in order to develop a method of manufacturing a thin film polarizer having a relatively low breakage occurrence rate and excellent process stability so as to resolve the problems as described above.

Hereinafter, exemplary embodiments of the present disclosure will be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

A method of manufacturing a thin film polarizer according to an exemplary embodiment of the present disclosure may include forming a film laminate by allowing a non-oriented polyvinyl alcohol-based film to be bonded to and sandwiched between two or more non-oriented polymer films using attractive force or an adhesive layer, orienting the film laminate so that an oriented polyvinyl alcohol-based film has a thickness of 10 μm or less, and separating the polymer films and the polyvinyl alcohol-based film of the oriented film laminate from each other.

In the case of using a film laminate in which a non-oriented polymer film is positioned on both surfaces of a non-oriented polyvinyl alcohol-based film as described above, since polymer films are located on upper and lower portions of one sheet of polyvinyl alcohol-based film to be sandwiched therebetween in a symmetrical manner, a possibility that the polyvinyl alcohol-based film may be transformed in subsequent processes, such as an orientation process of the film laminate and the like, may be reduced. Therefore, stability in the process of manufacturing a polarizer may be improved and curl properties at the time of manufacturing a polarizing plate may be excellent.

In addition, in the case of using such a film laminate, since two or more polymer films are used, a modulus of elasticity value of a polyvinyl alcohol-based film per unit area may be lowered when tension is applied to the film laminate, as compared to the case of using one sheet of polymer film, a breakage occurrence rate may be reduced. As a result, a high magnification orientation may be stably performed.

Further, in the case of a film laminate having the structure as described above, a peeling phenomenon in which a polyvinyl alcohol-based film is peeled off and/or a separation phenomenon in which the polyvinyl alcohol-based film is peeled off from a polymer substrate, and the like, occurring depending on a degree of swelling of the polyvinyl alcohol-based film in a wet orientation process for the manufacturing of a polarizer, may be effectively suppressed. Whereby, instability in a film laminate may be reduced.

In addition, in a wet orientation process in which a relatively low concentration of boron is used, in general, a phenomenon in which a swollen polyvinyl alcohol-based film is attached to a roll and wound therearound may occur, while according to an exemplary embodiment of the present disclosure, since a polymer substrate is located on both surfaces of the polyvinyl alcohol-based film, such a phenomenon may be prevented, and thus, the process may be carried out without damage to the laminate even in the case of using a low concentration of a boric aqueous solution.

On the other hand, in the case of a manufacturing method disclosed in an application having been filed for a patent by the applicant of the present disclosure, since a polyvinyl alcohol-based film is attached to one surface or both surfaces of a polymer film, a phenomenon in which the polyvinyl alcohol-based film is distorted in one direction of a polymer film may occur due to a difference in a degree of swelling between the polyvinyl alcohol-based film and the polymer film in a wet orientation process. However, in the case of the film laminate according to an exemplary embodiment of the present disclosure, since the polyvinyl alcohol-based film is not exposed to the outside, a phenomenon such as that described above may be suppressed to a significant degree, even in the case of performing a wet orientation process.

Further, in a case in which the polyvinyl alcohol-based film is exposed to the outside, when the film laminate is wound in the form of a rolled film before introduction to a polarizer manufacturing process, in general, damage to the polyvinyl alcohol-based film, a phenomenon in which surfaces of the polyvinyl alcohol-based film are attached to each other due to moisture, wrinkles, and the like may occur, while according to an exemplary embodiment of the present disclosure, the problems as described above may be prevented.

Hereinafter, a method of manufacturing a thin film polarizer according to an exemplary embodiment of the present disclosure will be described in further detail.

First, a non-oriented polyvinyl alcohol-based film may be bonded to and sandwiched between two or more non-oriented polymer films via attractive force or an adhesive layer to thus form a film laminate.

According to an exemplary embodiment of the present disclosure, the film laminate may be employed, as long as it has a structure in which a non-oriented polyvinyl alcohol-based film is disposed between two or more non-oriented polymer films, and the number of the non-oriented polymer films or the number of the non-oriented polyvinyl alcohol-based films is not particularly limited.

For example, the film laminate may have a structure including a first non-oriented polymer film, a first non-oriented polyvinyl alcohol-based film bonded to the first non-oriented polymer film, and a second non-oriented polymer film bonded to the first non-oriented polyvinyl alcohol-based film, for example, a structure of a non-oriented polymer film/a non-oriented polyvinyl alcohol-based film/a non-oriented polymer film.

Alternatively, the film laminate may also have a structure including a first non-oriented polymer film, a first non-oriented polyvinyl alcohol-based film bonded to the first non-oriented polymer film, a second non-oriented polymer film bonded to the first non-oriented polyvinyl alcohol-based film, a second non-oriented polyvinyl alcohol-based film bonded to the second non-oriented polymer film, and a third non-oriented polymer film bonded to the second non-oriented polyvinyl alcohol-based film, for example, a structure of a non-oriented polymer film/a non-oriented polyvinyl alcohol-based film/a non-oriented polymer film/a non-oriented polyvinyl alcohol-based film/a non-oriented polymer film. In addition to such structures, a film laminate having a structure in which a further increased number of polymer films or polyvinyl alcohol-based films are stacked on each other may also be used. Such a modification will also be included in the scope of the present disclosure.

In addition, in a case in which two or more polyvinyl alcohol-based films are included in the film laminate of the present disclosure, both surfaces of each of the polyvinyl alcohol-based films should also be provided with polymer films located thereon. Therefore, in an additional process with respect to the film laminate, a possibility that the polyvinyl alcohol-based film may be transformed may be reduced, and the principle thereof is as illustrated above.

On the other hand, the non-oriented polymer film used in the film laminate of the present disclosure may be provided to prevent the polyvinyl alcohol-based film from being broken in the orientation process and may be a polymer film having a maximum orientation magnification of five or more times at a temperature of 20° C. to 85° C. In this case, the maximum orientation magnification refers to an orientation magnification immediately before breakage occurs. On the other hand, the above-mentioned orientation may refer to a dry orientation process or a wet orientation process. In the case of the wet orientation process, a concentration of boron may indicate a maximum orientation magnification in a case in which the orientation process is performed using a boric acid aqueous solution having concentration of boron of 1.0 to 5 weight %.

As such a polymer film, for example, a high-density polyethylene film, a polyurethane film, a polypropylene film, a polyolefin film, an ester-based film, a low-density polyethylene film, high-density polyethylene and low-density polyethylene co-extrusion films, a copolymer resin film in which ethylene vinyl acetate is contained in high-density polyethylene, an acrylic film, a polyethylene terephthalate film, a polyvinyl alcohol-based film, a cellulose-based film, or the like may be used, but the present disclosure is not limited thereto.

On the other hand, the non-oriented polymer film used in the present disclosure may have a thickness of around 20 μm to 100 μm, in detail, around 30 μm to 80 μm, in further detail, around 40 μm to 60 μm. When the thickness of the non-oriented polymer film is less than 20 μm, since the polymer film may not sufficiently support the polyvinyl alcohol-based film in the orientation process of the film laminate, breakage or the like may occur. When the thickness of the non-oriented polymer film exceeds 100 μm, the orientation properties of the film laminate may be deteriorated, and free width contraction at the time of drying the polyvinyl alcohol-based film may be disturbed such that physical optical properties of an ultimately obtained polarizer may be degraded.

In addition, a glass transition temperature of the non-oriented polymer film may be lower than that of the polyvinyl alcohol-based film, and for example, may range from around 20° C. to 60° C., in further detail, around 30° C. to 60° C. Considering that a glass transition temperature of the polyvinyl alcohol-based film is generally in a range of around 70° C. to 80° C., when the glass transition temperature of the polymer film satisfies such a numerical range, the polymer film may have relatively softer characteristics under the orientation temperature conditions. As a result thereof, orientation characteristics of the polyvinyl alcohol-based film may be further improved. However, when the glass transition temperature is excessively low, since breakage may occur at the time of orientation at a high magnification, the glass transition temperature of the polymer film may be 20° C. or higher. On the other hand, the glass transition temperature may be measured using a differential scanning calorimeter (DSC). For example, when a sample of about 10 mg is sealed in a fan for a DSC only and is heated under a predetermined temperature rise conditions, an amount of absorbed heat and a calorific value generated while a phase change occurs may be measured in a temperature thereof to determine the glass transition temperature thereby.

In addition, in the case of the non-oriented polymer film, a modulus of elasticity thereof at a room temperature (approximately 25° C.) may range from around 200 MPa to 1500 MPa, in detail, from around 350 MPa to 1300 MPa. When the modulus of elasticity of the polymer film exceeds 1500 MPa, a high magnification orientation may be difficult to implement, and when the modulus of elasticity of the polymer film is less than 200 MPa, breakage may occur during the orientation process. In this case, the modulus of elasticity refers to a value obtained by measuring an extent of stress per unit area, based on strain provided by fixing both ends of a sample prepared according to JIS-K6251-1 standards and then applying force thereto in a direction perpendicular with respect to a thickness direction of a film. As a measurement device, for example, a Universal Testing Machine (Zwick/Roell 2010 UTM) or the like may be used.

In addition, in the case of the non-oriented polymer film, force at breaking point thereof at a room temperature (25° C.) may range from around 5N to 40N, in detail, from around 10N to 30N. In this case, the force at breaking point refers to strain obtained at a point in time at which a film is broken by fixing both ends of a sample and then applying strain thereto in a direction perpendicular with respect to a thickness direction of the film, and for example, may be measured using a Universal Testing Machine (Zwick/Roell Z010 UTM) or the like. When the force at breaking point of the non-oriented polymer film exceeds such numerical ranges, a high magnification orientation may be difficult to implement or breakage may occur during an orientation process.

On the other hand, in the case of the present disclosure, two or more polymer films are used. Here, the polymer films, for example, the first non-oriented polymer film, the second non-oriented polymer film, the third non-oriented polymer film, and the like may be the same polymer films as or different polymer films from each other.

Subsequently, a non-oriented polyvinyl alcohol-based film interposed between the non-oriented polymer films may have a thickness of around 10 to 60 µm, in detail, around 10 to 40 µm. In a case in which the thickness of the non-oriented polyvinyl alcohol-based film exceeds 60 µm, a thickness of 10 µm or less may not be easily obtained even after the orientation process, and in a case in which the thickness thereof is less than 10 µm, breakage may easily occur during the orientation process.

On the other hand, the non-oriented polyvinyl alcohol-based film may have a degree of polymerization of around 1,000 to 10,000, in detail, around 1,500 to 5,000, but is not limited thereto. When the degree of polymerization satisfies such a range, molecular movement may be facilitated, and molecules may be smoothly mixed with iodine, a dichroic dye or the like.

Further, as the non-oriented polyvinyl alcohol-based film according to an exemplary embodiment of the present disclosure, polyvinyl alcohol-based films for sale in the market may be used, and for example, PS30, PE30, PE60 by Kuraray, M2000, M3000, M6000 by Nippon Gohsei, or the like may be used.

On the other hand, two or more polyvinyl alcohol-based films may be used in the film laminate of the present disclosure, and the polyvinyl alcohol-based films may be identical to or different from each other in terms of a composition or a degree of polymerization thereof, and the like.

On the other hand, the non-oriented polyvinyl alcohol-based film may be a film in a state in which it is dyed with iodine and/or a dichroic dye. In further detail, the non-oriented polyvinyl alcohol-based film may be a film having been subjected to a swelling process and the dyeing process.

To this end, before orienting the film laminate, a process of dyeing the non-oriented polyvinyl alcohol-based film with iodine and/or a dichroic dye may be further performed, and in further detail, processes of swelling the non-oriented polyvinyl alcohol-based film and dyeing the swollen non-oriented polyvinyl alcohol-based film with iodine and/or a dichroic dye may be further carried out.

In this case, the process of swelling the non-oriented polyvinyl alcohol-based film may be performed to promote the iodine and/or a dichroic dye to be absorbed into and spread on the polyvinyl alcohol-based film and to improve orientation properties of the polyvinyl alcohol-based film. For example, the swelling process may be performed by dipping the non-oriented polyvinyl alcohol-based film in pure water of 25° C. to 30° C. for 5 to 30 seconds, in detail, for 10 to 20 seconds, but is not limited thereto. In addition, the swelling process may be performed such that the degree of swelling of the non-oriented polyvinyl alcohol-based film may be in a range of around 36% to 44%, in detail, around 38% to 42%. When the degree of swelling of the non-oriented polyvinyl alcohol-based film satisfies such numerical ranges, optical properties of an ultimately obtained thin film polarizer, such as a degree of polarization or the like, may be relatively excellent. On the other hand, the degree of swelling may be calculated and represented by {(Weight of polyvinyl alcohol-based film after swelling−Weight of polyvinyl alcohol-based film before swelling)/Weight of polyvinyl alcohol-based film before swelling}×100.

Further, the dyeing process may be performed by dipping the non-oriented polyvinyl alcohol-based film in a dyeing tub to be impregnated with a dyeing solution containing iodine and/or a dichroic dye or coating the polyvinyl alcohol-based film with a dyeing solution containing iodine and/or a dichroic dye. In this case, as a solvent of the dyeing solution, although water may be generally used, an organic solvent having compatibility with water may also be mixed with water. On the other hand, the content of iodine and/or a dichroic dye in the dyeing solution may range from 0.06 parts by weight to 0.25 parts by weight with respect to 100 parts by weight of a solvent. Furthermore, the dyeing solution may further contain a supplemental agent to improve dyeing efficiency in addition to iodine and/or a dichroic dye. As the supplemental agent, an iodized compound such as potassium iodide, lithium iodide, sodium iodide, zinc iodide, aluminum iodide, lead iodide, copper iodide, barium iodide, calcium iodide, tin iodide, titanium iodide, and mixtures thereof, may be used. In this case, the content of the supplemental agent may range from around 0.3 parts by weight to 2.5 parts by weight with respect to 100 parts by weight of a solvent, and in detail, a weight ratio of iodine to iodine may range from around 1:5 to 1:10. On the other hand, the dyeing process may be performed at a temperature of about 25° C. to 40° C., and the impregnation process time thereof in the dyeing tub may be around 30 to 120 seconds, but the present disclosure is not limited thereto.

On the other hand, the film laminate according to an exemplary embodiment may be manufactured by alternately bonding the non-oriented polymer films and the non-oriented polyvinyl alcohol-based films to each other via an adhesive or by alternately stacking the non-oriented polymer films and the non-oriented polyvinyl alcohol-based films without a separate medium material.

On the other hand, when the non-oriented polymer film and the non-oriented polyvinyl alcohol-based film are bonded to each other using attractive force, surface treatment may be performed on one surface or both surfaces of the polymer film or the polyvinyl alcohol-based film so as to have appropriate adhesion. In this case, the surface treatment may be carried out through commonly known various methods, for example, corona processing, plasma processing, surface modification processing using a strong alkali aqueous solution such as NaOH or KOH, or the like.

In a case in which the non-oriented polymer film and the non-oriented polyvinyl alcohol-based film are bonded to each other, a thickness of an adhesive layer before an orientation process may be in a range of around 20 nm to 4000 nm, in detail, around 20 nm to 1000 nm, in further detail, around 20 nm to 500 nm. A thickness of the adhesive layer after the orientation process of the film laminate may be in a range of around 10 nm to 1000 nm, in detail, around 10 nm to 500 nm, in further detail, around 10 nm to 200 nm. When the thicknesses of the adhesive layer before and after the orientation process of the film laminate satisfy the ranges described above, delamination of the polyvinyl alcohol-based film after the orientation process and a drying process may be facilitated without damage thereto.

A material of the adhesive is not particularly limited and various commonly known adhesives may be used without limitation. For example, the adhesive layer may be formed using a water-based adhesive or an ultraviolet curable adhesive.

In further detail, the adhesive layer may be formed using a water-based adhesive containing one or more selected from a group consisting of a polyvinyl alcohol-based resin, an acrylic resin, and a vinyl acetate-based resin.

Alternatively, the adhesive layer may be formed using a water-based adhesive containing an acrylic group and hydroxyl group-containing polyvinyl alcohol-based resin. Here, the acrylic group and hydroxyl group-containing polyvinyl alcohol-based resin may have a degree of polymerization of around 500 to 1800.

Alternatively, the adhesive layer may be formed using a water-based adhesive including an amine-based metal compound crosslinking agent and a polyvinyl alcohol-based resin containing an acetoacetyl group. In more detail, the adhesive may be an aqueous solution containing 100 parts by weight of the polyvinyl alcohol-based resin containing an acetoacetyl group and 1 to 50 parts by weight of the amine-based metal compound crosslinking agent.

Here, although a degree of polymerization and a degree of saponification of the polyvinyl alcohol-based resin are not particularly limited as long as the polyvinyl alcohol-based resin only includes an acetoacetyl group, the degree of polymerization thereof may be 200 to 4,000, and the degree of saponification thereof may be 70 mol % to 99.9 mol %. In this case, the polyvinyl alcohol-based resin may include the acetoacetyl group of 0.1 to 30 mol %. The action thereof with the amine-based metal compound crosslinking agent may be smooth within the range described above, and water resistance of a targeted adhesive may be sufficiently significant.

The amine-based metal compound crosslinking agent is a water-soluble crosslinking agent having a functional group having reactivity with the polyvinyl alcohol-based resin, and may have a metal mixture form containing an amine-based ligand. As a metal available for use therein, a transition metal such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), platinum (Pt), or the like may be used. As a ligand combined with a central metal, any ligand may be used, as long as it includes one or more amine group formed of a material such as a primary amine, a secondary amine (diamine), a tertiary amine, ammonium hydroxide, or the like.

In addition, in the case of such an adhesive, a content of a solid of the polyvinyl alcohol-based resin including the acetoacetyl group may be within a range of about 1 to 10 weight %. When the solid content of the polyvinyl alcohol-based resin is less than 1 weight %, since water resistance thereof may not be sufficiently secured, an effect of reducing the occurrence of breakage in the orientation process may be relatively low. When the solid content of the polyvinyl alcohol-based resin exceeds 10 weight %, users' working power may be weakened, and at the time of performing a separation process, a surface of the polyvinyl alcohol-based film may be damaged.

A pH of the adhesive may be in a range of around 4.5 to 9. When the PH of the adhesive satisfies the numerical range described above, storage properties and durability in a high moisture environment may be further improved.

On the other hand, a pH of the adhesive may be adjusted through a method of including an acid in an aqueous solution, and in this case, as acid used to adjust the pH thereof, strong acid and weak acid may both be used. For example, nitric acid, hydrochloric acid, sulfuric acid, acetic acid, or the like may be used.

On the other hand, a thickness of the adhesive layer formed using the adhesive as described above may be in a range of around 80 nm to 20 nm, in detail, around 80 nm to 150 nm, before the orientation process, and may be in a range of around 10 nm to 100 nm, in detail, around 10 nm to 80 nm, after the orientation process of the film laminate. When the thickness of the adhesive layer satisfy the ranges described above, adhesion between a base film and the polyvinyl alcohol-based film may be maintained at an appropriate level such that a breakage occurrence rate at an orientation process may be lowered and damage to a polarizer surface may be significantly reduced at the time of the occurrence of delamination.

In the case of the adhesive described above, a crosslinking reaction may occur between the amine-based metal compound and the acetoacetyl group of the polyvinyl alcohol-based resin such that water resistance of the adhesive layer after a curing process may be relatively high. Therefore, when the polymer film and the polyvinyl alcohol-based film are stacked using the adhesive, a phenomenon in which the adhesive dissolves in water may be significantly reduced so as to be more usefully used in the wet orientation process.

On the other hand, the adhesive layer may also be formed using an ultraviolet curable adhesive including, for example, a first epoxy compound in which a glass transition temperature of a homopolymer is 120° C. or higher, a second epoxy compound in which a glass transition temperature of a homopolymer is 60° C. or less, and a cationic photopolymerization initiator. In detail, the ultraviolet curable adhesive may include 100 parts by weight of the first epoxy compound in which a glass transition temperature of a homopolymer is 120° C. or higher, 30 to 100 parts by weight of the second epoxy compound in which a glass transition temperature of a homopolymer is 60° C. or less, and 0.5 to 20 parts by weight of the cationic photopolymerization initiator.

In the present disclosure, the epoxy compound may refer to a compound in which one or more epoxy groups are contained in a molecule, in detail, a compound in which two or more epoxy groups are contained in a molecule, and may refer to a concept including a monomer, a polymer, or all of compounds of a resin form. In more detail, the epoxy compound according to an exemplary embodiment of the present disclosure may have the form of a resin.

On the other hand, as the first epoxy compound, any epoxy compound may be used without particular limitations as long as it is an epoxy compound in which a glass transition temperature of a homopolymer is 120° C. or higher. For example, an aromatic epoxy and/or an alicyclic epoxy compound in which the glass transition temperature of a homopolymer is 120° C. or higher may be used as the first epoxy compound of the present disclosure. As a detailed example of the epoxy compound in which the glass transition temperature of a homopolymer is 120° C. or higher, 3,4-epoxycyclohexylmethyl-3,4'-epoxycyclohexanecarboxylate, vinylcyclohexene dioxide dicyclopentadiene dioxide, bis epoxy cyclopentyl ether, a bisphenol A-based epoxy compound, a bisphenol F-based epoxy compound, and the like, may be provided. In further detail, as the first epoxy compound, an epoxy compound in which the glass transition temperature of a homopolymer is within a range of around 120° C. to 200° C. may be used.

As the second epoxy compound, any epoxy compound may be used without particular limitation, as long as it is an epoxy compound in which the glass transition temperature of a homopolymer is 60° C. or less. For example, as the second epoxy compound, an alicyclic epoxy compound, an aliphatic epoxy compound, and the like, may be used.

In this case, as the alicyclic epoxy compound, a 2-functional epoxy compound, for example, a compound having two epoxy groups may be used. In further detail, a compound in which two epoxy groups are both alicyclic epoxy groups may be used, but is not limited thereto.

As the aliphatic epoxy compound, an epoxy compound having an aliphatic epoxy group other than an alicyclic epoxy group may be used, by way of example. For example, polyglycidyl ether of aliphatic polyhydric alcohol; a polyglycidyl ether of alkylene oxide addition product with aliphatic polyhydric alcohol; polyglycidyl ether of polyester polyol of aliphatic polyhydric alcohol and aliphatic polyhydric carboxylic acid; polyglycidyl ether of aliphatic polyhydric carboxylic acid; polyglycidyl ether of polyester polycarboxylic acid of aliphatic polyhydric alcohol and aliphatic polyhydric carboxylic acid; a dimer, an oligomer, or a polymer obtained through vinyl polymerization of glycidyl acrylate or glycidyl methacrylate; or an oligomer or a polymer obtained through vinyl polymerization of a vinyl-based monomer different from glycidyl acrylate or glycidyl methacrylate may be used. In detail, polyglycidyl ether of aliphatic polyhydric alcohol or alkylene oxide addition product thereof may be used, but the present disclosure is not limited thereto.

In this case, as the aliphatic polyhydric alcohol, for example, aliphatic polyhydric alcohols having a carbon number range of 2 to 20, 2 to 16, 2 to 12, 2 to 8, or 2 to 4 may be provided by way of example. For example, aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol; alicyclic diols such as cyclohexanedimethanol, cyclohexanediol, hydrogenated bisphenol A, and hydrogenated bisphenol F; trimethylolethane, trimethylolpropane, hexitols, pentitols, glycerine, polyglycerine, pentaerythritol, dipentaerythritol, tetramethylolpropane, and the like, may be used.

In addition, as the alkylene oxide, alkylene oxide having a carbon number range of 1 to 20, 1 to 16, 1 to 12, 1 to 8, or 1 to 4 may be provided by way of example. For example, ethyleneoxide, propyleneoxide, butyleneoxide, or the like, may be used.

In addition, as examples of the aliphatic polyhydric carboxylic acid, oxalic acid, malonic acid, succinic acid, glutaric acid, adipic acid, pimelic acid, suberic acid, azelaic acid, sebacic acid, dodecanoic acid, 2-methylsuccinic acid, 2-methyladipic acid, 3-methyladipic acid, 3-methylpentanoic acid, 2-methyloctanoic acid, 3,8-dimethyl decanoic acid, 3,7-dimethyl decanoic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylmethylenecyclohexane, 1,2,3-propanetricarboxylic acid, 1,2,3,4-butanetetracarboxylic acid, 1,2,3,4-cyclobutanetetracarboxylicacid, and the like, may be provided. However, the present disclosure is not limited thereto.

In detail, the second epoxy compound of the present disclosure may contain one or more glycidyl ether groups. For example, as the second epoxy compound according to an exemplary embodiment of the present disclosure, one or more selected from a group consisting of 1,4-cyclohexanedimethanol diglycidyl ether, 1,4-butanediol diglycidyl ether, 1,6-hexanediol diglycidyl ether, neopentyl diglycidyl ether, resorcinol diglycidyl ether, diethylene glycol diglycidyl ether, ethylene glycol diglycidyl ether, trimethylolpropanetriglycidyl ether, n-butyl glycidyl ether, 2-ethylhexyl glycidyl ether, phenyl glycidyl ether, and o-cresyl glycidyl ether may be used.

The second epoxy compound in which the glass transition temperature of a homopolymer ranges from around 0° C. to 60° C. may be used.

Meanwhile, in further detail, as the epoxy compound according to an exemplary embodiment of the present disclosure, a combination of a first epoxy compound containing one or more epoxidized aliphatic ring groups and a second epoxy compound containing one or more glycidyl ether groups may be used, but the present disclosure is not limited thereto.

After forming the film laminate as described above, the film laminate may be subjected to an orientation process. Here, the orientation process may be performed so that the polyvinyl alcohol-based film may have a thickness of 10 μm or less, in detail, may have a thickness of around 1 μm to 10 μm, around 3 μm to 10 μm, or around 1 μm to 5 μm.

On the other hand, although orientation conditions according to an exemplary embodiment of the present disclosure are not particularly limited, the orientation process may be performed, for example, at a temperature of 20° C. to 85° C. and at an orientation magnification of 5 to 15 times, in further detail, at a temperature of 40° C. to 80° C. and at an orientation magnification of 5 to 12 times.

In this case, the orientation process may be performed through wet orientation or dry orientation. However, since in the case of the wet orientation process, surface adhesion of a thermoplastic polyurethane film and a polyvinyl alcohol-based film may be increased as compared to that in the dry orientation process, the wet orientation process may be performed in that it is stably performed without a separate adhesive unit. The wet orientation process may be performed in a boron aqueous solution. Here, boron concentration of the boron aqueous solution may range from around 1.0 to 5.0 wt %.

In a case in which the orientation process is performed in the boron aqueous solution as described above, a breakage occurrence rate of a PVA film may be reduced due to boron crosslinking such that stability in the process may be increased and the occurrence of wrinkles in the PVA film occurring during a wet process may be suppressed. In addition, the orientation process may also be performed at a relatively low temperature as compared to that in the case of a dry orientation process.

On the other hand, a process of manufacturing a polarizing element may generally include a washing process, a swelling process, a dyeing process, a cleaning process, an orientation process, a complementary process, a drying process, and the like, but in the case of the present disclosure, the cleaning and orientation processes may be performed using a boric acid aqueous solution. In detail, in the case of the cleaning process, the concentration of boron may be within a range of around 0.1 to 2.5 wt %, or in further detail, around 0.5 to 2.0 wt %, and in the case of the orientation process, the concentration of boron may be within a range of around 1.0 to 5.0 wt %, or in further detail, around 1.5 to 4.5 wt %.

Figure 1:
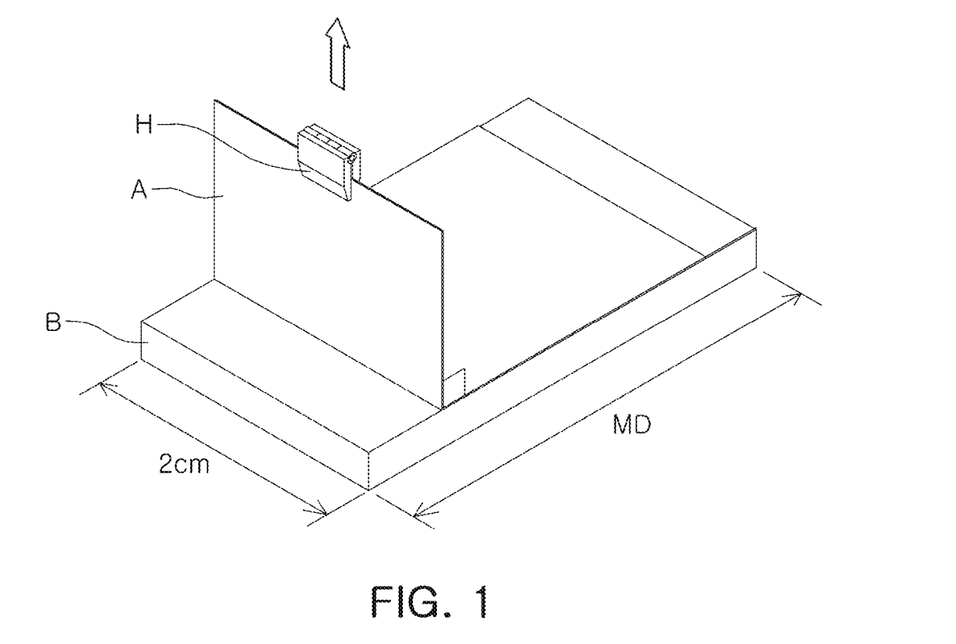
FIG. 1 is a drawing illustrating a method of measuring adhesion or peel strength using a Texture Analyzer.

On the other hand, after the orientation process of the film laminate, adhesion between the oriented polyvinyl alcohol-based film and the oriented polymer film may be 2N/2 cm or less, in detail, in a range of around 0.1 to 2N/2 cm, in further detail, around 0.1 to 1N/2 cm. When the adhesion between the oriented polyvinyl alcohol-based film and the oriented polymer film satisfies the range above, damage to a surface may be significantly reduced in a separation process. According to the manufacturing method of the present disclosure, in a case in which an adhesive layer is formed between the polyvinyl alcohol-based film and the polymer film, since the adhesive layer as well as the polyvinyl alcohol-based film is oriented in the orientation process, a thickness of the adhesive layer may be reduced to a level of 10 to 50% as compared to the case before the orientation process. As a result, the adhesion between the polyvinyl alcohol-based film and the polymer film may be lowered to 2N/2 cm or less, such that the separation process may be facilitated. In this case, the adhesive force may be measured when samples, for example, films having a length of 2 cm, are adhered, and a detailed measuring method is illustrated in FIG. 1. In the present disclosure, the adhesive force between the films indicates a magnitude of peel strength measured when separating a polyvinyl alcohol film A from a polymer film B by applying force in a direction perpendicular with respect to a surface direction of the film laminate after fixing the polyvinyl alcohol film. A of the film laminate using a sample holder H, as illustrated in FIG. 1. In this case, as the measuring device, a TextureAnalyzer (TA-XT Plus) by Stable Micro Systems was used.

After the film laminate is oriented as described above, the oriented film laminate may further be subjected to a drying process as needed. In this case, the drying process may be performed at a temperature of around 20° C. to 100° C., or in further detail, around 40 to 90° C., for 1 to 10 minutes. The drying process may prevent a polarizer from being deteriorated in physical properties due to moisture during a polarizing plate manufacturing process, through removal of moisture from a PVA surface and inside, and may induce shrinkage in a width direction of the oriented polyvinyl alcohol film to be smoothly performed during the drying process so as to increase directivity of a dyed body including polyvinyl alcohol and iodine and thus improve a degree of polarization of the polarizer.

Subsequently, the polymer film and the polyvinyl alcohol-based film of the oriented film laminate may be separated from each other. In the present disclosure, the separation process may be carried out through a method of applying a relatively low level of peel strength to the polyvinyl alcohol-based film such that both films are detached from each other. In this case, the peel strength may be 2N/2 cm or less, and for example, may be in a range of around 0.1 to 2N/2 cm, or in further detail, around 0.1 to 1N/2 cm.

In the case of the present disclosure as described above, since peel strength required at the time of separating the polyvinyl alcohol-based film from the polymer film is relatively weak as compared to the case in which stacking is performed through a coating method or a co-extrusion method, both films may be easily separated from each other without a separate process and without using separate devices, and damage to the polyvinyl alcohol-based film may be significantly reduced in the separation process such that significantly excellent optical performance may be exhibited.

On the other hand, the method of manufacturing a thin film polarizer according to an exemplary embodiment of the present disclosure may be performed through a commonly known sheet-to-sheet process, a sheet-to-roll process, a roll-to-roll process, or the like. Here, the sheet-to-sheet process may be performed through a method of using a sheet-fed type film cut from a raw material film (for example, from the polyvinyl alcohol-based film or from the polymer film) to have a predetermined size, and the sheet-to-roll process may be performed through a method in which as a portion of raw material films, a roll type film in which an elongated film is wound is used, and as the remaining raw material film thereof, a sheet-fed type film cut to have a predetermined size is used. In addition, the roll-to-roll process may be performed through a method in which a roll type film is used as a raw material film. In consideration of continuity and productivity in the process, the roll-to-roll process, among the processes described above, may be used.

For example, the method of manufacturing a thin film polarizer according to an exemplary embodiment of the present disclosure may include forming a film laminate including two or more non-oriented polymer films and a non-oriented polyvinyl alcohol-based film by disposing a non-oriented polyvinyl alcohol-based film roll between non-oriented polymer film rolls and bonding a polyvinyl alcohol-based film and polymer films to each other using attractive force or an adhesive layer having adhesive force of 2N/2 cm or less while unwinding the polyvinyl alcohol-based film and the polymer films from the film rolls; orienting the film laminate so that the polyvinyl alcohol-based film provided after the orientation process has a thickness of 10 μm or less; and separating the polymer films and the polyvinyl alcohol-based film of the oriented film laminate from each other.

After the two or more non-oriented polymer films and the non-oriented polyvinyl alcohol-based film are bonded to each other, a re-winding process thereof may be performed such that the bonded film may be rewound in the form of a roll, and the film laminate may be unwound from the re-wound film laminate roll so as to be introduced to an orientation process, or an orientation process thereof may be immediately performed without a re-winding process.

In addition, the separation process may be performed through a method of inserting a delaminating unit (for example, a delamination roll) between the polymer film and the polyvinyl alcohol-based film so as to separate the polymer film from the polyvinyl alcohol-based film at an interface therebetween and winding the separated polymer film and polyvinyl alcohol-based film around different rolls, respectively.

The polarizer of the present disclosure manufactured through the method as described above may have a significantly thin thickness of 10 μm or less, in detail, around 1 μm to 10 μm, in further detail, around 3 μm to 10 μm. In addition, even in the case of such a thin thickness, polarizer group transmittance may be in a range of around 40 to 45% and a degree of polarization may be 99% or more, whereby significantly excellent physical optical properties may be exhibited.

In addition, the polarizer according to an exemplary embodiment of the present disclosure may have significantly excellent uniformity in the degree of polarization in a width direction of the polarizer. In detail, in the case of the polarizer according to an exemplary embodiment of the present disclosure, a standard deviation with respect to a degree of polarization, measured at ten points spaced apart from one another at equidistant intervals in the width direction of the polarizer, may be 0.002% or less.

On the other hand, a polarizing plate may be formed by stacking a transparent film on one surface or both surfaces of a polarizer according to an exemplary embodiment of the present disclosure as described above. In this case, as the transparent film, various films commonly used as a polarizer protective film or a retardation film may be used without particular limitation. For example, the transparent film such as an acrylic film, a polyethylene terephthalate (PET) film, a PET film treated with an acrylic primer, a cellulose-based film, a cyclic olefin-based film, a polycarbonate-based film, a polynorbornene-based film, and the like, may be used.

A method of stacking a polarizer and a transparent film on each other is not particularly limited and a commonly known film laminating method may be used. For example, a method in which an adhesive or a cohesive agent is applied to at least one surface of the polarizer and/or a transparent film and then laminating the polarizer and the transparent film, or the like, may be used. Here, the cohesive adhesive or the adhesive may be appropriately selected depending on a material of the transparent film, and the like. For example, when a tri-acetyl-cellulose (TAC) film is used as the transparent film, a water-based adhesive such as a polyvinyl alcohol-based adhesive may be used, and when an acrylic film, a cycloolefin polymer (COP) film, or the like is used as the transparent film, a photocurable adhesive or a thermosetting adhesive such as an acrylic adhesive or an epoxy-based adhesive may be used.

Although the method of stacking a polarizer and a transparent film on each other is not particularly limited, a roll-to-roll scheme using a polarizer film roll and a transparent film roll may be used in terms of productivity. Since the method of manufacturing a polarizing plate by stacking a polarizer and a transparent film on each other through the roll-to-roll scheme is a commonly used method, a detailed description thereof will be omitted. In a case in which the polarizing plate is manufactured through the roll-to-roll scheme, an elongated roll-type polarizing plate may be obtained.

In addition to the transparent film, the polarizing plate according to an exemplary embodiment of the present disclosure may further include a different functional optical layer such as a brightness improvement film, a primer layer, a hard coating layer, a glare proof layer, an antireflective layer, or a cohesive layer for adhesion to a liquid crystal panel, and the like. A method of forming the optical layer is not particularly limited, and a commonly known method may be used.

The polarizing plate according to an exemplary embodiment of the present disclosure may have excellent optical properties while having a significantly reduced thickness as compared to that of a polarizing plate according to the related art, so as to be usefully employed in display devices such as a liquid crystal display panel, an organic electroluminescence device, and the like.

MODE FOR EMBODIMENTS OF INVENTION

Hereinafter, the present disclosure will be described in further detail, based on the following embodiments.

Embodiment 1

Three sheets of non-oriented polyurethane film and two sheets of non-oriented polyvinyl alcohol-based film were alternately stacked on each other without using a medium material to thus form a film laminate having a structure of a non-oriented polyurethane film/a non-oriented polyvinyl alcohol-based film/a non-oriented polyurethane film/a non-oriented polyvinyl alcohol-based film/a non-oriented polyurethane film.

In this case, as the non-oriented polyvinyl alcohol-based film, a PE30 grade polyvinyl alcohol-based film (thickness: 30 μm) by Kuraray was used, and swollen in a pure solution at 25° C. for 15 seconds and was then subjected to a dyeing process performed using an iodine solution having a concentration of 0.3 wt % at a temperature of 25° C. for 60 seconds.

As the non-oriented polyurethane film, a film manufactured using a thermoplastic polyurethane resin obtained by reacting methylene diphenyl diisocyanate, 1,4-butandiol, and adipic acid with each other, was used.

Comparative Example 1

Three sheets of non-oriented polyvinyl alcohol-based film and two sheets of non-oriented polyurethane film were alternately stacked on each other without using a medium material to thus form a film laminate having a structure of a non-oriented polyvinyl alcohol-based film/a non-oriented polyurethane film/a non-oriented polyvinyl alcohol-based film/a non-oriented polyurethane film/a non-oriented polyvinyl alcohol-based film. As the non-oriented polyvinyl alcohol-based film and the non-oriented polyurethane film, the same films as those of Embodiment 1 were used.

Comparative Example 2

A film laminate having a structure of a non-oriented polyvinyl alcohol-based film/a non-oriented polyurethane film/a non-oriented polyvinyl alcohol-based film was formed by alternately stacking a non-oriented polyvinyl alcohol-based film to both surfaces of a non-oriented polyurethane film. As the non-oriented polyvinyl alcohol-based film and the non-oriented polyurethane film, the same films as those of Embodiment 1 were used.

Comparative Example 3

A PE30 grade polyvinyl alcohol-based film (thickness: 30 μm) by Kuraray was swollen in a pure solution at 25° C. for 15 seconds and was then subjected to a dyeing process performed using an iodine solution having a concentration of 0.3 wt % at a temperature of 25° C. for 60 seconds.

Experimental Example 1

Measurement of Breakage Occurrence Rate

The film laminates of Embodiment 1 and Comparative Examples 1 and 2, and the polyvinyl alcohol-based film of Comparative Example 3 were subjected to the cleaning process in a solution having 1 wt % of boron for 15 seconds, and the film laminates were then oriented at an orientation magnification of 6 to 8 times, immediately before breakages occur in at least one polyvinyl alcohol-based film.

A ratio of a thickness of the polyvinyl alcohol-based film after an orientation process to a thickness of the polyvinyl alcohol-based film before the orientation process was calculated by the following numerical expression. A calculation result thereof is illustrated in FIG. 2.

Thickness Ratio($dr$)(%)={Thickness of Polyvinyl Alcohol-based Film after Orientation($d$)/Thickness of Polyvinyl Alcohol-based Film before Orientation($do$)}×100

The lower a value of the thickness ratio (dr) is, orientation may be performed without breakages, which indicates that a thickness of the polyvinyl alcohol-based film provided after orientation is relatively reduced.

Figure 2:
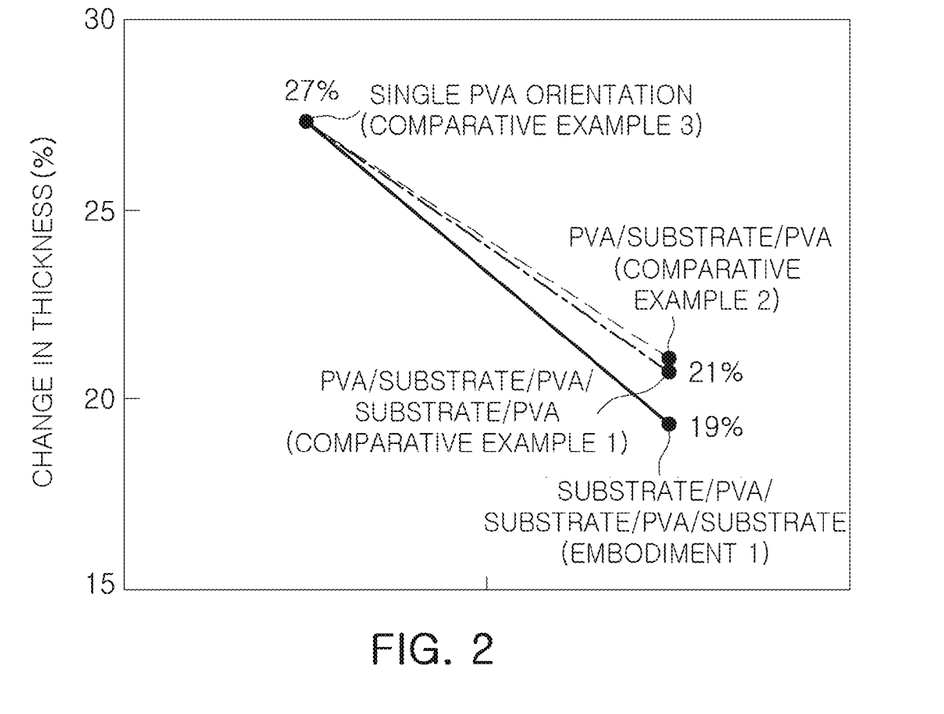
FIG. 2 is a graph comparing breakage occurrence rates of film laminates manufactured in Embodiment 1 of the present disclosure and Comparative Examples 1 and 2.

As illustrated in FIG. 2, in the case of Comparative Example 3 in which the polyvinyl alcohol-based film is oriented alone, the thickness ratio (dr) is around 27%. Further, the thickness ratios (dr) in Comparative Example 1 and Comparative Example 2 are in a range of approximately 21% to 22%. Meanwhile, in the case of Embodiment 1 of the present disclosure, the thickness ratio (dr) is 19%, from which it can be appreciated that the orientation was appropriately performed without breakages as compared to the cases of Comparative Examples 1 and 2.

Embodiment 2

The non-oriented film laminate of Embodiment 1 was subjected to a cleaning process in a solution having 1 wt % of boron for 15 seconds and then oriented at an orientation magnification of 7 times, in a solution including 2.5 wt % of boron at 52° C. After the orientation process was carried out, a complementary process thereof was performed using 5 wt % of a potassium iodide (KI) solution, and the film laminate was then dried in an oven at 80° C. for five minutes. Then, a thin film polarizer was obtained by separating the polyvinyl alcohol-based film from a polyurethane substrate in the oriented film laminate. A thickness of the thin film polarizer was in a range of 7 to 10 μm.

Figure 3:
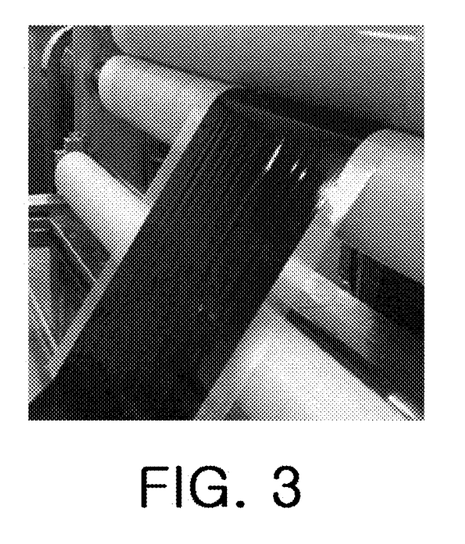
FIG. 3 is a photograph illustrating a surface state of a thin film polarizer manufactured in Embodiment 2 of the present disclosure.

On the other hand, FIG. 3 is an image illustrating a surface state of the film laminate completed in the drying process of Embodiment 2. As illustrated in FIG. 3, it can be appreciated that in the case of using the film laminate of Embodiment 2, a stabilized orientation process may be performed without the occurrence of breakages and a surface state of the polyvinyl alcohol-based film is uniform and good.

Embodiment 3

4 weight % of an aqueous solution was produced by dissolving polyvinyl alcohol (an average degree of polymerization of 2000, a degree of saponification of 94%, By Nippon Gohsei) containing an acetoacetyl group (5 wt %) in pure water. Here, 6.7 parts by weight of a titanium amine complex crosslinking agent (TYZOR TE by Dupont) with respect to 100 parts by weight of polyvinyl alcohol was added and stirred to be mixed so as to manufacture adhesive A.

The adhesive A was coated on both surfaces of one sheet of a non-oriented polyurethane film to a thickness of 100 nm, and two sheets of non-oriented polyvinyl alcohol-based film were then bonded thereto to manufacture a film laminate 1 having a structure of a non-oriented polyvinyl alcohol-based film/a non-oriented polyurethane film/a non-oriented polyvinyl alcohol-based film. Then, the film laminate 1 was swollen in a pure solution at 25° C. for 15 seconds, and then subjected to a dyeing process in an iodine solution having a concentration of 0.3 wt % at a temperature of 25° C. for 60 seconds.

Then, a non-oriented film laminate having a structure of non-oriented polyurethane/a non-oriented polyvinyl alcohol-based film/a non-oriented polyurethane film/a non-oriented polyvinyl alcohol-based film/non-oriented polyurethane by bonding two sheets of non-oriented polyurethane film to both surfaces of the film laminate 1 through attractive force.

In this case, as the non-oriented polyvinyl alcohol-based film, an M2000 grade polyvinyl alcohol-based film (thickness: 20 μm) by Nippon Gohsei was used, and as the non-oriented polyurethane film, a film manufactured using a thermoplastic polyurethane resin obtained by reacting methylene diphenyl diisocyanate, 1,4-butandiol, and adipic acid with each other, was used.

The non-oriented film laminate was subjected to a cleaning process in a solution having 1 wt % of boron for 15 seconds, and the film laminate was then oriented at an orientation magnification of 7 times, in a solution including 2.5 wt % of boron at 52° C. After the orientation process was carried out, a complementary process thereof was performed in 5 wt % of a potassium iodide (KI) solution, and the film laminate was then dried in an oven at 80° C. for five minutes. Then, two sheets of thin film polarizer having a thickness of 5 to 8 μm were obtained by separating the polyurethane film from the polyvinyl alcohol-based film through peel strength of 0.7N/2 cm.

Experimental Example 2

Measurement of Physical Optical Properties

In the case of the thin film polarizers manufactured according to Embodiments 2 and 3, physical optical properties such as polarizer group transmittances, degrees of polarization, polarizer group colors, orthogonal colors, and the like were measured using JASCO V-7100 Spectrophotometer. Measurement results thereof are provided in the following [Table 1].

TABLE 1

| Classification | Single Transmittance (%) | Degree of Polarization (%) | Single Color a | Single Color b | Cross Color a | Cross Color b |
|---|---|---|---|---|---|---|
| Embodiment 2 | 40.44 | 99.9860 | −0.50 | 1.78 | 0.89 | −1.71 |
| Embodiment 3 | 40.75 | 99.9893 | −0.61 | 1.99 | 0.71 | −1.57 |

In the case of the thin film polarizers manufactured according to the method of the present disclosure with reference to [Table 1] above, it can be appreciated that physical optical properties such as polarizer single transmittances, degrees of polarization, color sense, and the like are excellent.

DESCRIPTION OF REFERENCE CHARACTERS

H: Holder
A: Polyvinyl Alcohol-based Film
B: Polymer Film
MD: Longitudinal Orientation Direction

The invention claimed is:

1. A method of manufacturing a thin film polarizer, comprising:
    forming a film laminate by allowing a non-oriented polyvinyl alcohol-based film to be bonded to and sandwiched between two or more non-oriented polymer films using attractive force or an adhesive layer;
    orienting the film laminate so that the polyvinyl alcohol-based film has a thickness of 10 μm or less; and
    separating the polymer films and the polyvinyl alcohol-based film of the oriented film laminate from each other,
    wherein adhesion between the polyvinyl alcohol-based film and the polymer film after the orienting of the film laminate is 2N/2 cm or less,
    wherein the non-oriented polymer film comprises one or more selected from a group including a high-density polyethylene film, a polyurethane film, a polypropylene film, a polyolefin film, an ester-based film, a low-density polyethylene film, high-density polyethylene and low-density polyethylene coextrusion films, a copolymer resin film containing ethylene vinyl acetate in high-density polyethylene, an acrylic film, a polyethylene terephthalate film, and a polyvinyl alcohol-based film,
    wherein the orienting of the film laminate is performed through wet orientation at a temperature of 20° C. to 85° C. at an orientation magnification of 5 to 15 times, and
    wherein one or more sheets of thin film polarizer are obtained by separating two or more polymer films and one or more polyvinyl alcohol-based film of the oriented film laminate from each other.

2. The method of claim 1, wherein the film laminate comprises a first non-oriented polymer film, a first non-oriented polyvinyl alcohol-based film bonded to the first non-oriented polymer film, and a second non-oriented polymer film bonded to the first non-oriented polyvinyl alcohol-based film.

3. The method of claim 1, wherein the film laminate comprises a first non-oriented polymer film, a first non-oriented polyvinyl alcohol-based film bonded to the first non-oriented polymer film, a second non-oriented polymer film bonded to the first non-oriented polyvinyl alcohol-based film, a second non-oriented polyvinyl alcohol-based film bonded to the second non-oriented polymer film, and a third non-oriented polymer film bonded to the second non-oriented polyvinyl alcohol-based film.

4. The method of claim 1, wherein the orienting of the film laminate is performed in a boron aqueous solution having a boron concentration ranging from 1 to 5 wt %.

5. The method of claim 1, further comprising dyeing the non-oriented polyvinyl alcohol-based film with at least one of iodine and a dichroic dye before the orienting of the film laminate.

6. The method of claim 1, wherein the separating of the polymer film from the polyvinyl alcohol-based film in the oriented film laminate is performed by applying 2N/2 cm or less of peel strength.

* * * * *